United States Patent
He et al.

(10) Patent No.: US 9,338,192 B1
(45) Date of Patent: May 10, 2016

(54) CONNECTION MANAGEMENT USING CONNECTION REQUEST TRANSFER PROTOCOL

(71) Applicant: JUNIPER NETWORKS, INC., Sunnyvale, CA (US)

(72) Inventors: Junxiao He, Saratoga, CA (US); Jaspal Kohli, Sunnyvale, CA (US); Kumar Narayanan, Saratoga, CA (US); Arun Kumar Srinivasan, Kanchipuram (IN)

(73) Assignee: Juniper Networks, Inc., Sunnyvale, CA (US)

( * ) Notice: Subject to any disclaimer, the term of this patent is extended or adjusted under 35 U.S.C. 154(b) by 411 days.

(21) Appl. No.: 13/730,023

(22) Filed: Dec. 28, 2012

(51) Int. Cl.
*G06F 15/16* (2006.01)
*H04L 29/06* (2006.01)
*H04L 29/08* (2006.01)

(52) U.S. Cl.
CPC ............ *H04L 65/1069* (2013.01); *H04L 67/28* (2013.01); *H04L 69/16* (2013.01); *H04L 69/165* (2013.01)

(58) Field of Classification Search
CPC combination set(s) only.
See application file for complete search history.

(56) References Cited

U.S. PATENT DOCUMENTS

| | | | |
|---|---|---|---|
| 7,711,956 B2 * | 5/2010 | Kinoshita et al. | 713/168 |
| 2008/0177829 A1 * | 7/2008 | Banerjee et al. | 709/203 |
| 2009/0132714 A1 * | 5/2009 | Blander et al. | 709/227 |
| 2009/0177788 A1 * | 7/2009 | Ishikawa et al. | 709/228 |
| 2012/0239775 A1 * | 9/2012 | Hubbard et al. | 709/217 |
| 2012/0271905 A1 * | 10/2012 | Issa | 709/213 |
| 2014/0122580 A1 * | 5/2014 | Nuaimi et al. | 709/203 |

* cited by examiner

*Primary Examiner* — Chris Parry
*Assistant Examiner* — Stephen Houlihan
(74) *Attorney, Agent, or Firm* — Harrity & Harrity, LLP

(57) ABSTRACT

A network device receives, from a client device, a client request associated with a connection with a server device, where the client request identifies requested content. The network device determines connection information that identifies the connection with the server device, transmits, to a proxy server, a connection transfer request that identifies the connection information and the requested content, and receives, from the proxy server, an indication that the proxy server is capable of providing the requested content. Based on receiving the indication, the network device provides, from the proxy server to the client device, a response to the client request, and provides, from the proxy server and to the server device, information that causes the server device to terminate the connection. The network device may use a connection request transfer protocol to transmit the connection transfer request, and the client request may be an HTTP request.

20 Claims, 13 Drawing Sheets

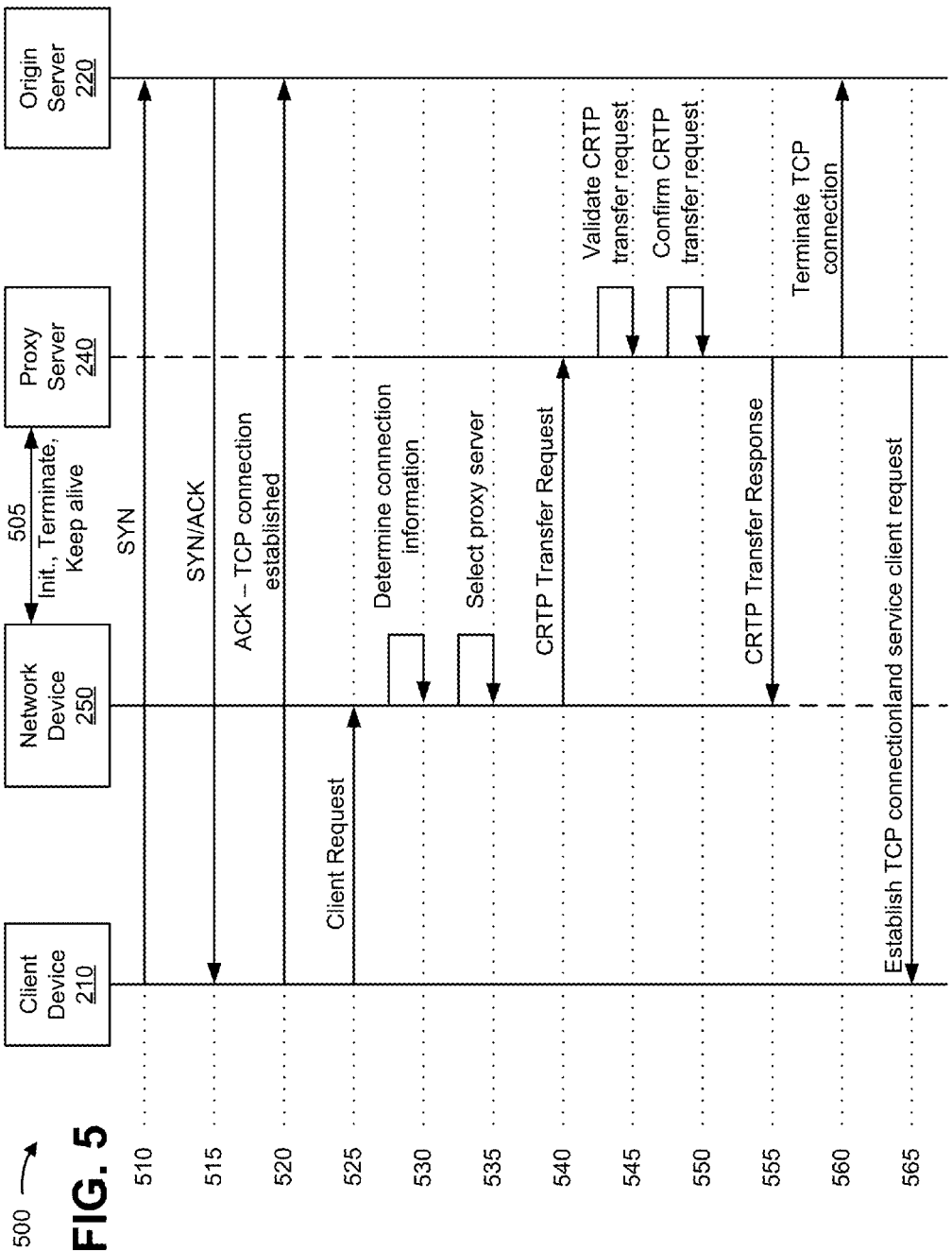

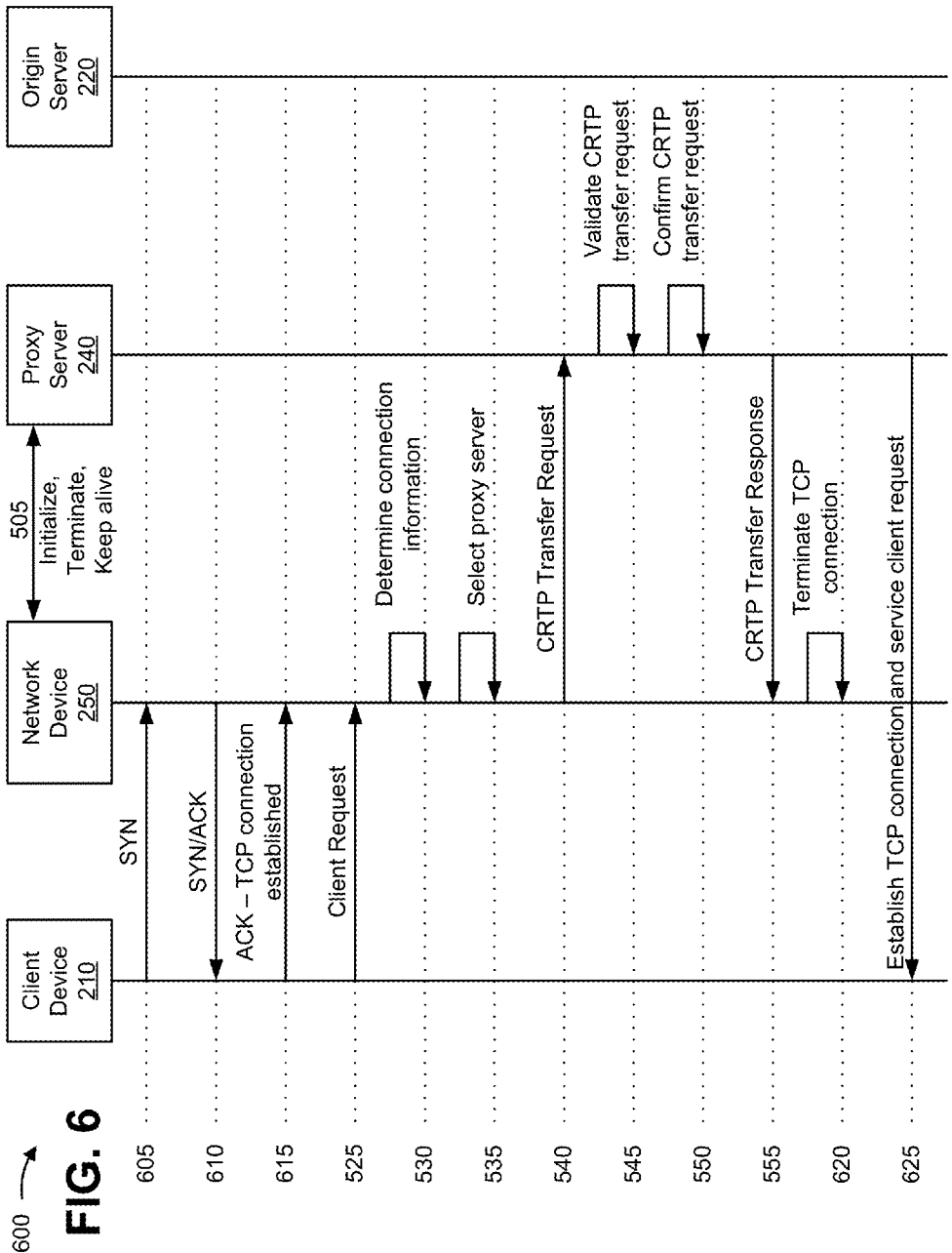

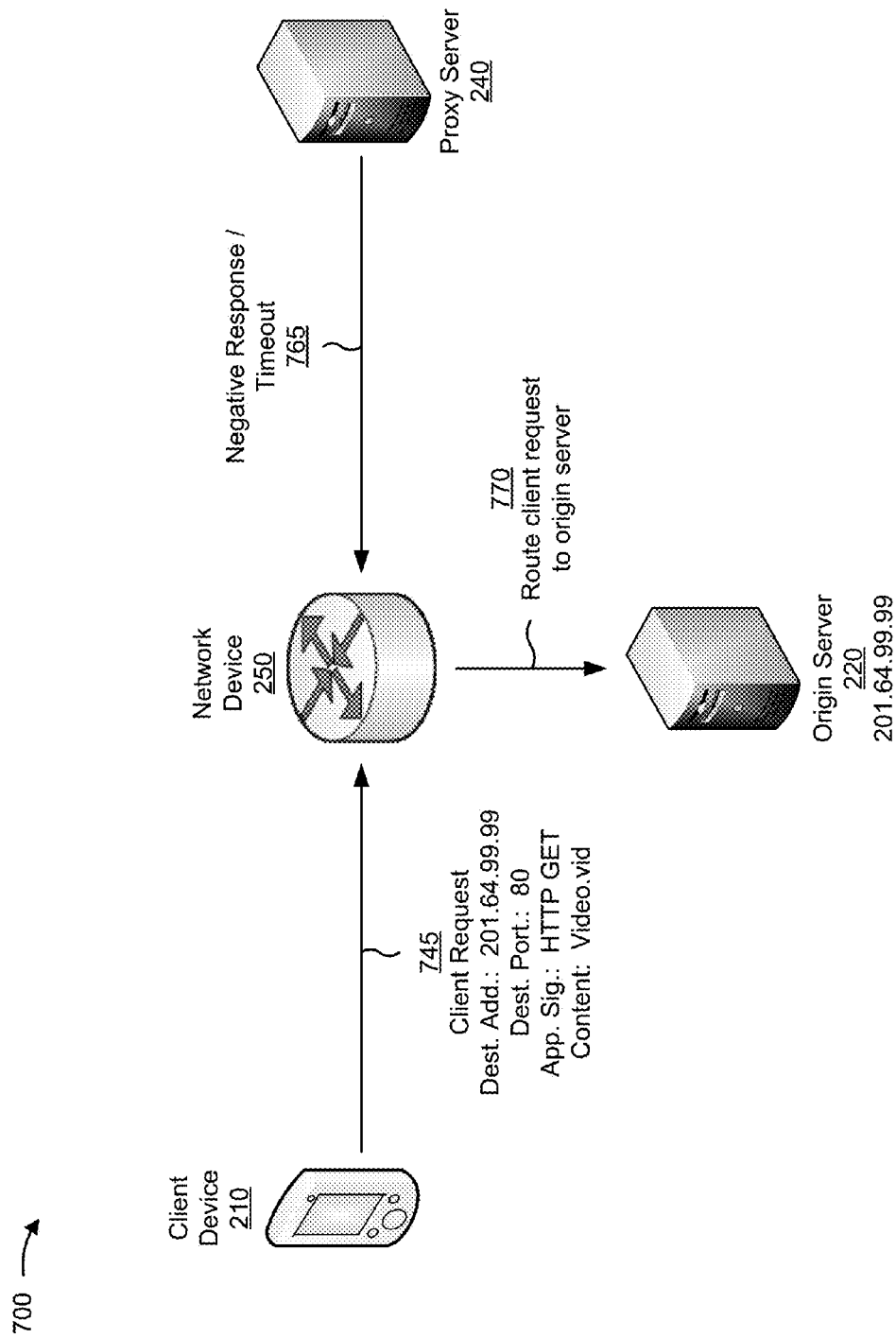

CONNECTION MANAGEMENT USING CONNECTION REQUEST TRANSFER PROTOCOL

BACKGROUND

A server cluster is a group of computers (sometimes referred to as servers, proxies, or nodes) interconnected via a local area network. The computers in the server cluster may work together to improve performance over the performance achieved by a single computer. For example, server clusters may improve information availability and response time through redundant data storage.

BRIEF DESCRIPTION OF THE DRAWINGS

FIGS. 5 and 6 are diagrams of example call flows for transferring a connection to a proxy server using a connection request transfer protocol (CRTP); and FIGS. 7A-7F are diagrams of example implementations relating to the example process shown in FIG. 4.

DETAILED DESCRIPTION

The following detailed description of example implementations refers to the accompanying drawings. The same reference numbers in different drawings may identify the same or similar elements.

A group of computers (sometimes referred to as servers, proxies, or nodes) interconnected via a local area network may be referred to as a server cluster (e.g., in a data center, a point of presence, etc.). The computers in the server cluster may work together to improve performance over the performance achieved by a single computer. For example, a server cluster may improve information availability and response time through redundant data storage. A set of servers that stores information also stored on one or more other servers may be referred to as a proxy cluster. The redundant storage may be referred to as a cache.

A proxy cluster may be used to service requests from client devices (e.g., personal computers, mobile devices, etc.). However, servicing client requests using a proxy cluster may cause processing delays due to bottlenecks at devices that analyze and route incoming requests and responses. Servicing the client requests with a proxy cluster may require complex routing policies for symmetric routing to ensure that requests and responses are routed through the same devices. The client requests may place a large demand on resources due to a need to intercept, track, and manage all connections (e.g., transmission control protocol (TCP) connections) that pass through the proxy cluster. Implementations described herein may alleviate such issues by using a connection request transfer protocol (CRTP) to intercept client device requests that can be serviced by the proxy cluster and to establish a direct connection (e.g., a TCP connection) between a proxy server in the cluster and the client device.

Figure 1A:
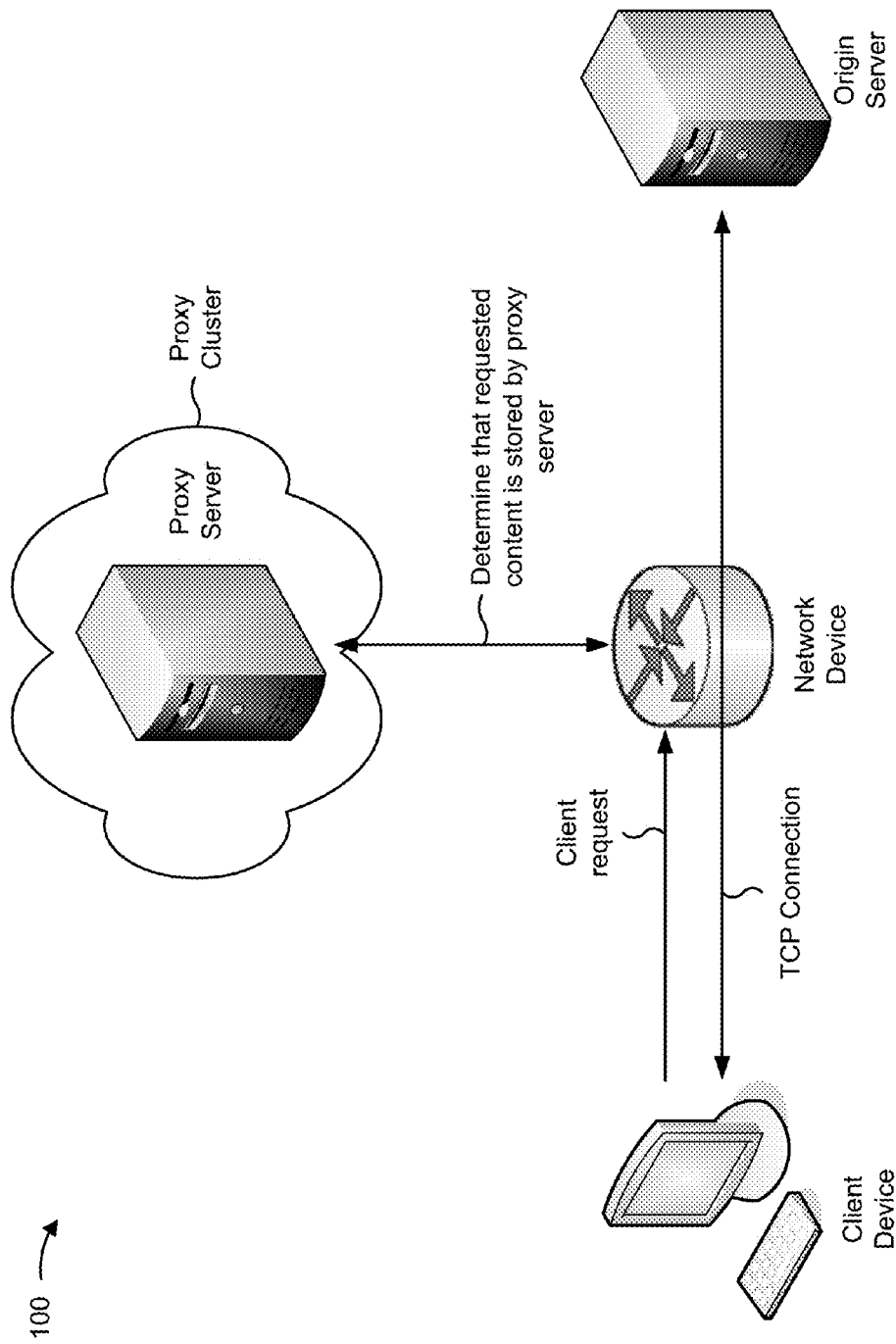
FIGS. 1A and 1B are diagrams of an overview of an example implementation described herein.
Figure 1B:
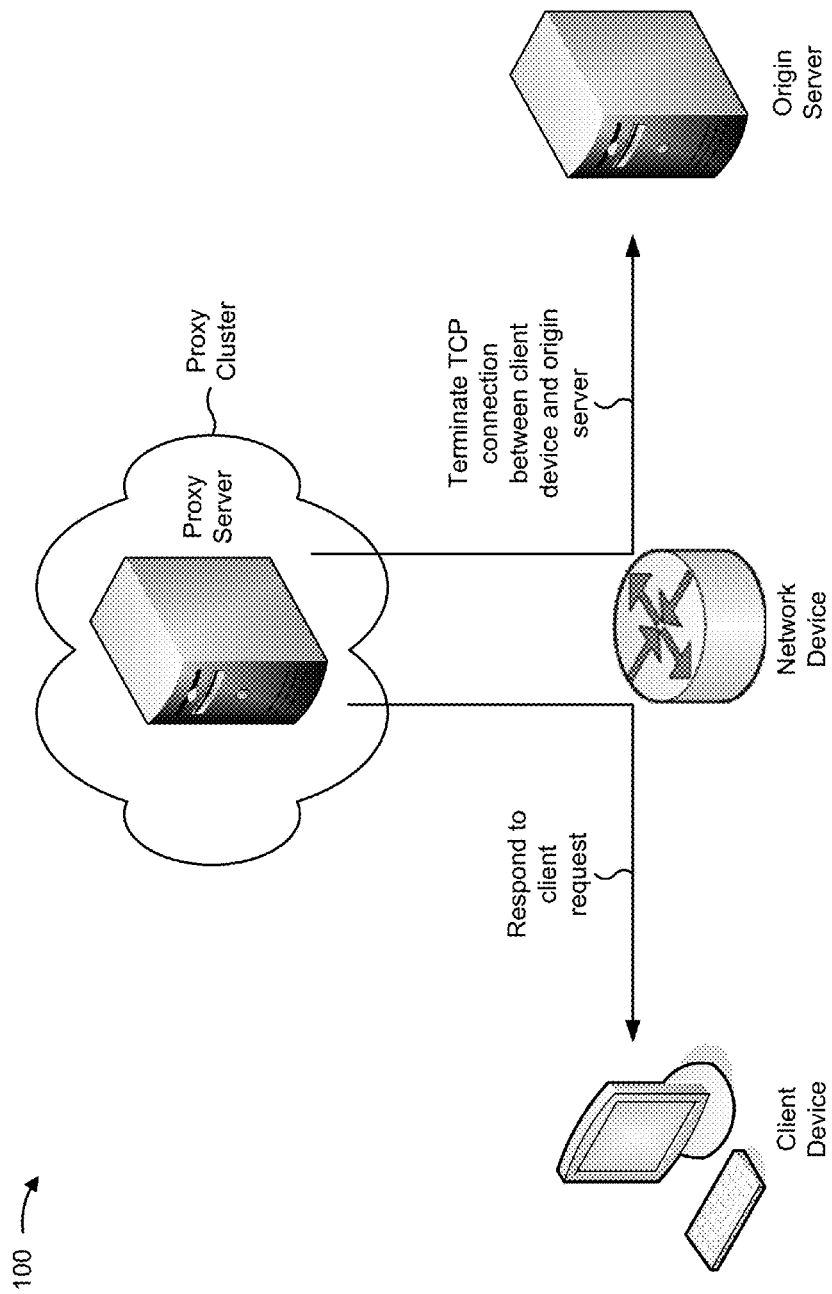

FIGS. 1A and 1B are diagrams of an overview of an example implementation 100 described herein. As shown in FIG. 1A, implementation 100 may include a client device, an origin server, a proxy server included in a proxy cluster, and a network device. The client device may include, for example, a personal computer or a mobile device. The origin server may include, for example, a server device. The proxy server may include, for example, one or more server devices included in the proxy cluster. The network device may include a router, a switch, etc. that may route traffic between the client device, the origin server, and/or the proxy server.

As further shown in FIG. 1A, the network device may assist in establishing a connection (e.g., a transmission control protocol (TCP) connection) between the client device and the origin server. For example, the client device may request content, such as a video, from the origin server. The client device and the origin server may establish a TCP connection so that the origin server can respond to the request (e.g., by providing the content). The network device may receive the client request, may determine the origin server that provides the requested content, and may provide information to the client device and the origin server that assists in establishing the TCP connection between the client device and the origin server.

Once the TCP connection has been established, the network device may determine whether the client request can be serviced by the proxy server (e.g., in the proxy cluster). For example, the network device may determine whether the proxy server stores (e.g., caches) the requested content. If the requested content is not cached by the proxy server, the network device may forward the client request to the origin server.

As shown in FIG. 1B, if the requested content is cached by the proxy server, the proxy server may terminate the TCP connection between the client device and the origin server (e.g., by sending a TCP termination command, to the origin sever, via the network device), and may respond to the client request by providing the requested content to the client device (e.g., via the network device). The response may establish a TCP connection between the client device and the proxy server, which may be used to service the client request. To establish the TCP connection, the proxy server may create an endpoint (e.g., may provision a socket, port, etc.) for TCP packets transmitted by the client device (e.g., packets that otherwise would have been transmitted to the origin server, but that have been intercepted by the network device and forwarded to the proxy server).

Figure 2:
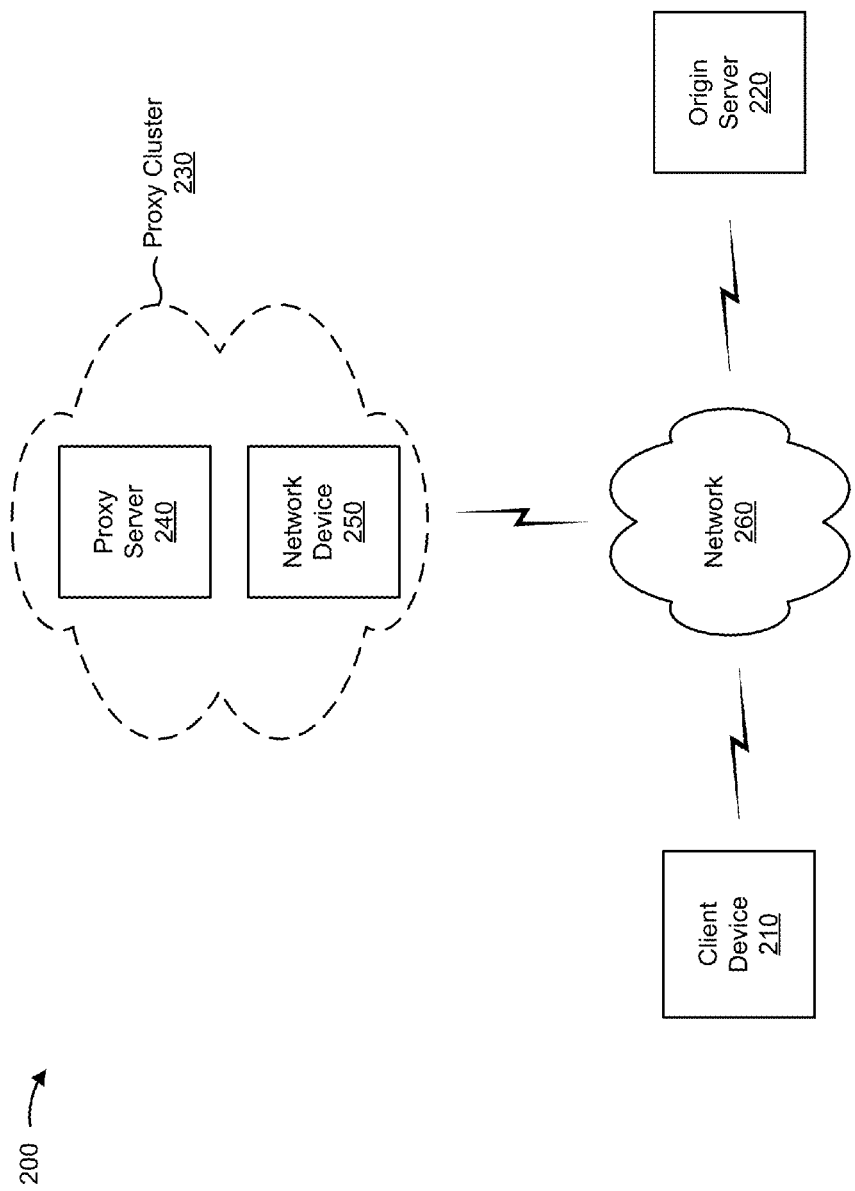
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an origin server 220, a proxy cluster 230, a proxy server 240, a network device 250, and a network 260. The devices of environment 200 may interconnect (e.g., via network 260) via wired connections, wireless connections, or a combination of wired and wireless connections.

Client device 210 may include a device capable of accessing network 260 and/or communicating with the devices shown in FIG. 2. For example client device 210 may include a desktop computer, a laptop computer, a tablet computer, a handheld computer, a smart phone, a radiotelephone, a gaming system, a set-top box, or a similar device. In some implementations, client device 210 may request content from origin server 220 and/or proxy server 240, and may receive the requested content from origin server 220 and/or proxy server 240.

Origin server 220 may include one or more servers (e.g., application servers, web servers, etc.), or similar types of computation and communication devices (e.g., a desktop computer, a laptop computer, etc.). Origin server 220 may store content, and may provide the content to client device 210 based on a request for the content.

Proxy cluster 230 may include one or more servers, or similar types of computation and communication devices, interconnected via a network (e.g., a local area network). For example, proxy cluster 230 may include multiple proxy servers 240, which may be organized into a multi-tier structure (e.g., a multi-tier data center). Proxy cluster 230 may also include network device 250. In some implementations, network device 250 may act as a tier one node in a multi-tier proxy cluster 230, and proxy server 240 may act as a tier two node in a multi-tier proxy cluster 230.

Proxy server 240 may include one or more servers, or similar types of computation and communication devices (e.g., a desktop computer, a laptop computer, etc.). Proxy server 240 may store content, and may provide the content to client device 210 based on a request for the content. In some implementations, proxy server 240 may store and/or provide content that is a duplicate of content stored by origin server 220. In some implementations, proxy server 240 may include a device that manages one or more proxy servers 240 (e.g., a device that selects a proxy server 240 to provide content based on, for example, load balancing, server capabilities, an algorithm etc.). Additionally, or alternatively, proxy servers 240 may communicate with one another to coordinate content storage and availability, exchange service availability status, exchange connections to achieve load balancing, etc.

Network device 250 may include one or more traffic transfer devices. For example, network device 250 may include a router, a switch, a firewall, a hub, a bridge, a gateway, a modem, a network interface card (NIC), an optical add-drop multiplexer (OADM), a server, and/or another device capable of transmitting, receiving, transferring, and/or processing network traffic. Network device 250 may transfer traffic between and/or among the devices shown in FIG. 2. In some implementations, network device 250 may be included in proxy cluster 230. Additionally, or alternatively, network device 250 may be included in network 260. In some implementations, a first network device 250 included in proxy cluster 230 may communicate with (e.g., by transferring traffic to and/or receiving traffic from) a second network device 250 included in network 260.

Network 260 may include one or more wired and/or wireless networks. For example, network 260 may include a cellular network, a public land mobile network ("PLMN"), a radio access network, a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, network 260 may include a switch, or another traffic transfer device, that connects network device 250 to proxy server 240.

The number of devices/networks shown in FIG. 2 is provided for explanatory purposes. In practice, environment 200 may include additional devices/networks, fewer devices/networks, different devices/networks, or differently arranged devices/networks. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
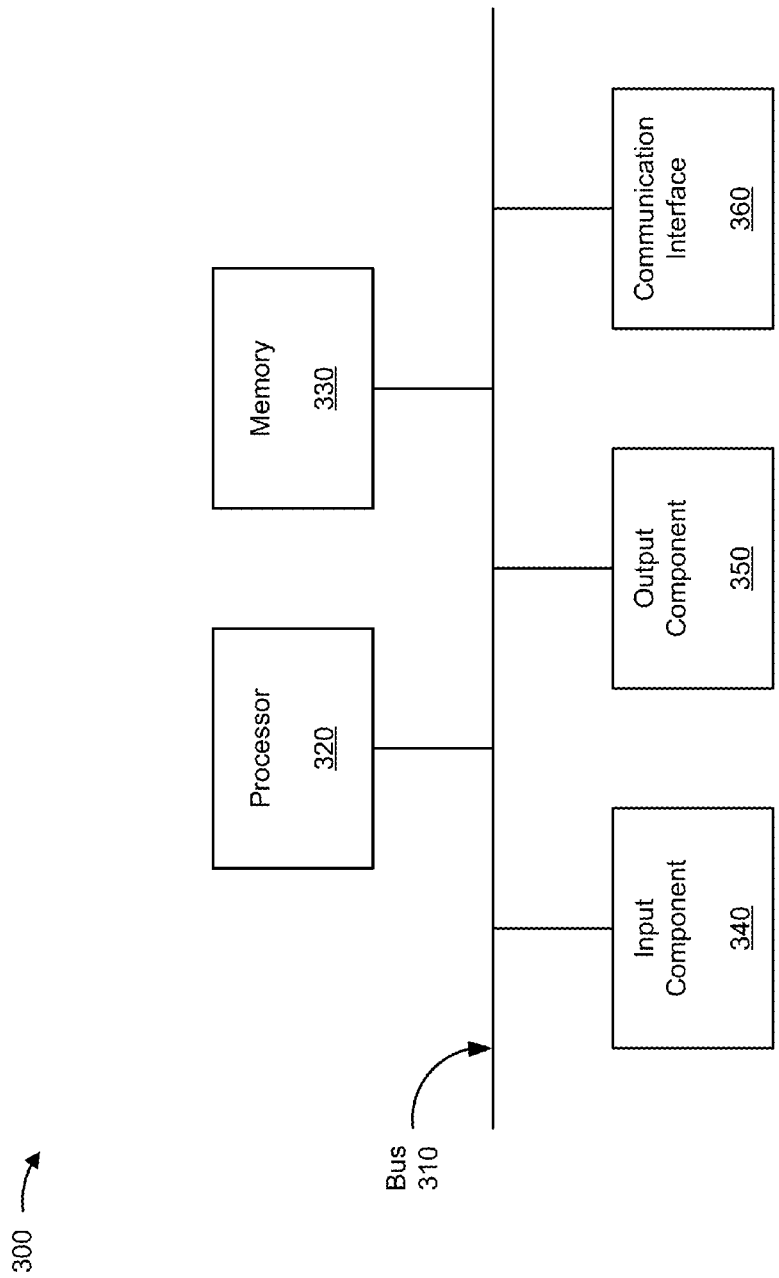
FIG. 3 is a diagram of example components of one or more devices of FIG. 2.

FIG. 3 is a diagram of example components of a device 300. Device 300 may correspond to client device 210, origin server 220, proxy server 240, and/or network device 250. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3. Additionally, or alternatively, each of client device 210, origin server 220, proxy server 240, and/or network device 250 may include one or more devices 300 and/or one or more components of device 300.

Figure 4:
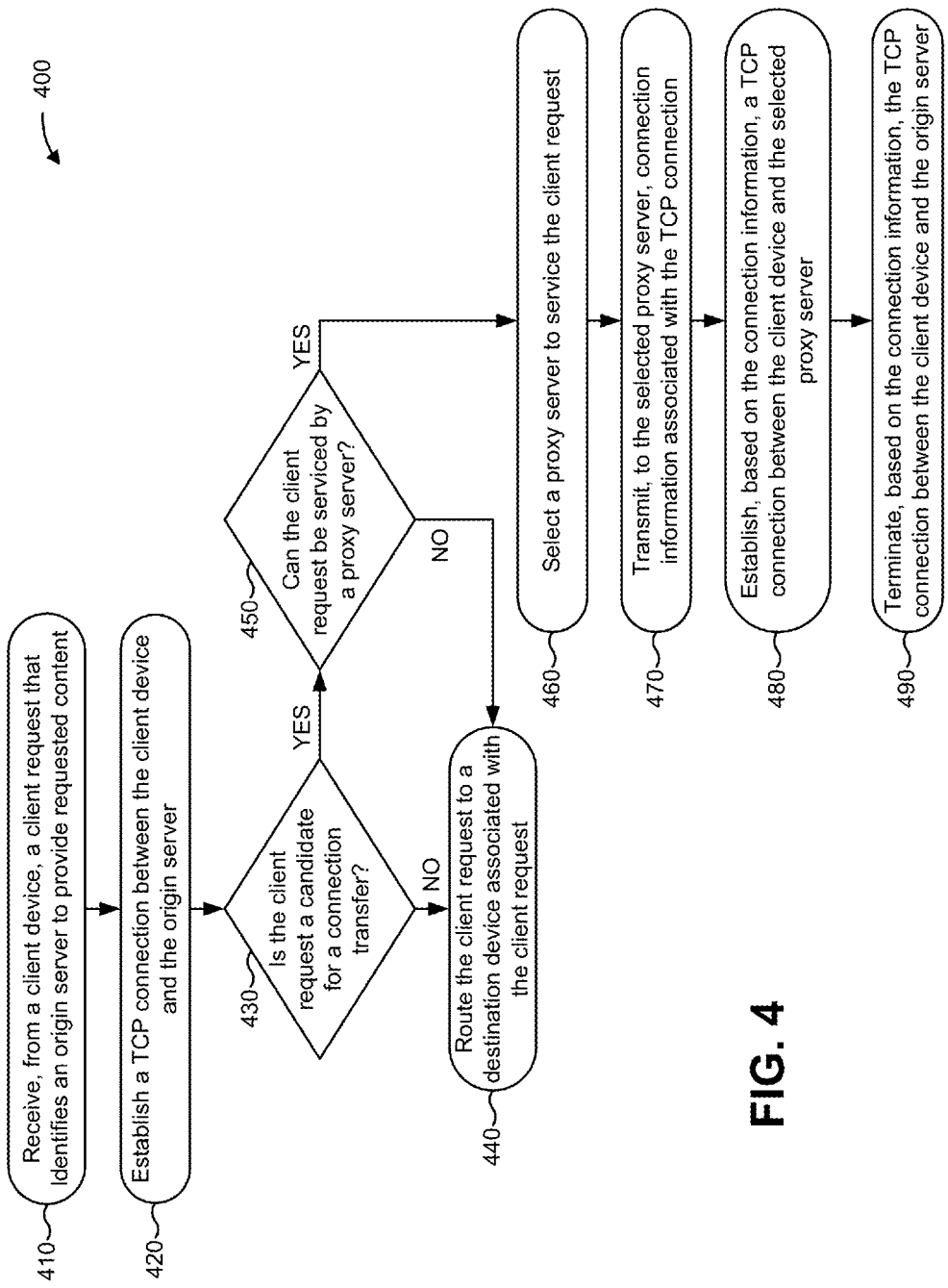
FIG. 4 is a flow chart of an example process for transferring a connection to a proxy server.

FIG. 4 is a flow chart of an example process 400 for transferring a connection to a proxy server. In some implementations, one or more process blocks of FIG. 4 may be performed by network device 250. Additionally, or alternatively, one or more process blocks of FIG. 4 may be performed by another device or a group of devices separate from or including network device 250, such as proxy server 240.

As shown in FIG. 4, process 400 may include receiving, from a client device, a client request that identifies an origin server to provide requested content (block 410). For example, network device 250 may receive the client request, and may analyze the client request to determine an origin server 220 to provide content requested in the client request. In some implementations, the client request may include a packet that identifies origin server 220 as a destination. The requested content may include textual content, an image, media content (e.g., audio, video, etc.), streaming content, a web page, or any other content.

As further shown in FIG. 4, process 400 may include establishing a transmission control protocol (TCP) connection between the client device and the origin server (block 420). For example, network device 250 may provide, to client device 210 and/or origin server 220, connection information that assists in establishing a TCP connection. Client device 210 and origin server 220 may use the connection information to establish a TCP connection.

The connection information may include information that identifies, for example, a source network address associated with the TCP connection (e.g., an Internet protocol (IP) address of client device 210); a destination network address associated with the TCP connection (e.g., an IP address of origin server 220); a source port associated with the TCP connection (e.g., that serves as an endpoint for the TCP connection on client device 210); a destination port associated with the TCP connection (e.g., that serves as an endpoint for the TCP connection on origin server 220); a sequence number associated with the TCP connection (e.g., an initial receive sequence number from client device 210 and/or origin server 220, an initial send sequence number from client device 210 and/or origin server 220, a current sequence number from client device 210 and/or origin server 220, etc.); an acknowledgement number associated with the TCP connection; a window size associated with the TCP connection, a protocol associated with the TCP connection (e.g., IP version 4 (IPv4), IP version 6 (IPv6), etc.); an application signature associated with the TCP connection (e.g., a GET, HEAD, extended hello (EHLO), HELO, etc. signature or command identified in the client request); etc. In some implementations, the connection information may be identified in the client request (e.g., in a packet included in the client request).

In some implementations, the TCP connection may be established by a three-way handshake process. For example, client device 210 may transmit, to origin server 220 (via network device 250), a packet that includes a request for a TCP connection to be established, also known as a SYN (synchronize) packet. Origin server 220 may receive the SYN packet, and may transmit, to client device 210 (via network device 250), a packet that includes an acknowledgement that the SYN packet was received, also known as a SYN/ACK (synchronize/acknowledgement) packet. Client device 210 may receive the SYN/ACK packet, and may transmit, to origin server 220 (via network device 250), a packet that includes an acknowledgment that the SYN/ACK packet was received, also known as an ACK (acknowledgement) packet. A TCP connection between client device 210 and origin device 220 may be established using this three-way handshake process (SYN, SYN/ACK, and ACK).

As shown in FIG. 4, process 400 may include determining whether the client request is a candidate for a connection transfer (block 430). For example, network device 250 may determine whether the client request is a candidate for connection transfer based on the connection information associated with the client request, such as a TCP port (e.g., a source port, a destination port, etc.), an application signature (e.g., GET, HEAD, EHLO, etc.), a protocol associated with the client request, and/or other connection information (e.g., a uniform resource locator (URL) associated with an HTTP request, a header associated with an HTTP request, etc.) identified in the client request. Additionally, or alternatively, network device 250 may determine whether the client request is a candidate for connection transfer based on whether the connection information associated with the client request (e.g., a destination address, a destination port, etc.) is identified in a data structure (e.g., a routing table) accessible by network device 250.

If the client request is not a candidate for the connection transfer (block 430—NO), then process 400 may include routing the client request to a destination device associated with the client request (block 440). For example, if network device 250 determines that the connection information identified by the client request does not meet one or more criteria (e.g., stored in a data structure accessible by network device 250), then network device 250 may route the client request to a destination device identified in the request (e.g., origin server 220). For example, if the client request is not associated with a TCP protocol, a particular TCP port, a particular network address, a particular application signature, etc., then network device 250 may route the client request to origin server 220. Additionally, or alternatively, if network device 250 determines that the client request is identified in a routing table (e.g., identified by destination network address, destination port, etc.), then network device 250 may route the client request to a destination device identified in the routing table as being associated with the client request (e.g., origin server 220, proxy server 240, or another device).

If the client request is a candidate for the connection transfer (block 430—YES), then process 400 may include determining whether the client request can be serviced by a proxy server (block 450). For example, if network device 250 determines, based on the connection information associated with the client request (e.g., as explained in connection with blocks 430 and 440, above), that the client request is a candidate for a connection transfer, then network device 250 may determine whether the client request can be serviced by proxy server 240.

In some implementations, network device 250 may determine whether the client request can be serviced by proxy server 240 by analyzing the client request to determine whether the client request is associated with cacheable or non-cacheable information. Additionally, or alternatively, network device 250 may transmit, to proxy server 240, information that identifies the content requested by client device 210. Proxy server 240 may determine whether the requested content is stored by proxy server 240 (or another proxy server 240 in proxy cluster 230), and may transmit, to network device 250, an indication of whether the requested content is stored by and/or accessible by proxy server 240. Network device 250 may determine whether the client request can be serviced by proxy server 240 based on the received indication.

If the client request cannot be serviced by the proxy server (block 450—NO), then process 400 may include routing the client request to a destination device associated with the client request (block 440). For example, if network device 250 determines that the client request is for non-cacheable information (e.g., bank account information, credit card information, sensitive personal information, etc.), then network device 250 may route the client request to origin server 220. Additionally, or alternatively, if network device 250 receives an indication that proxy server 240 does not store the requested content, then network device 250 may route the client request to origin server 220.

If the client request can be serviced by the proxy server (block 450—YES), then process 400 may include selecting a proxy server to service the client request (block 460). For example, if network device 250 determines that the client request is for cacheable information (e.g., streaming audio or video, a broadcast, a cacheable web page, etc.), and/or if network device 250 receives an indication that proxy server 240 can provide the requested content, then network device 250 may select a proxy server 240 to service the client request.

In some implementations, network device 250 may select a proxy server 240 to service the client request based on one or more algorithms, such as a round robin algorithm, a load balancing algorithm (e.g., least load first), an application hash algorithm, a least connections algorithm (e.g., least connections first), and/or a weighted version of these or other algorithms. In some implementations, network device 250 may select a proxy server 240 to service the request when determining whether a proxy server 240 can service the request. For example, when transmitting, to proxy server 240, the information that identifies the content requested by client device 210, network device 250 may include a hash algorithm that may be applied to select a proxy server 240 to service the client request.

As shown in FIG. 4, if the client request can be serviced by a proxy server (block 450—YES), then process 400 may further include transmitting, to the selected proxy server, connection information associated with the TCP connection (block 470). For example, network device 250 may transmit connection information, associated with the TCP connection between client device 210 and origin server 220, to proxy server 240. In some implementations, network device 250 may transmit the connection information to proxy server 240 along with the information that identifies the content requested by client device 210. The connection information may identify, for example, a network address, a port number, a sequence number, an acknowledgement number, a window size, a protocol, an application signature, etc., as described elsewhere herein.

As shown in FIG. 4, if the client request can be serviced by a proxy server (block 450—YES), then process 400 may further include establishing, based on the connection information, a TCP connection between the client device and the selected proxy server (block 480), and terminating, based on the connection information, the TCP connection between the client device and the origin server (block 490). For example, proxy server 240 may use the connection information, received from network device 250, to create a TCP connection endpoint (e.g., a port, a socket, etc.) on proxy server 240 for a TCP connection with client device 210. Additionally, or alternatively, proxy server 240 may use the connection information, received from network device 250, to terminate the TCP connection (e.g., to terminate a TCP connection endpoint on origin server 220) between client device 210 and origin server 220. In some implementations, proxy server 240 may establish the TCP connection (e.g., by creating an endpoint) without transmitting a TCP control packet to client device 210.

In some implementations, rather than terminating a TCP connection between client device 210 and origin server 220, and establishing a TCP connection between client device 210 and proxy server 240, process 400 may include terminating a TCP connection between client device 210 and a first proxy server 240, and establishing a TCP connection between client device 210 and a second proxy server 240. In other words, process 400 may include transferring a TCP connection from an origin server 220 to a proxy server 240, and/or transferring a TCP connection from a first proxy server 220 to a second, different proxy server 240.

While a series of blocks has been described with regard to FIG. 4, the blocks and/or the order of the blocks may be modified in some implementations. For example, in some implementations, process block 450 may occur before process block 430. In some implementations, process block 460 may occur before and/or concurrently with process block 430. Additionally, or alternatively, non-dependent blocks may be performed in parallel.

FIG. 5 is a diagram of an example call flow 500 for transferring a connection to a proxy server using a connection request transfer protocol (CRTP). Call flow 500 may use CRTP in an asymmetric proxy cluster 230 to service client requests via proxy server 240. An asymmetric proxy cluster 230 may route traffic from client device 210 to origin server 220 via a different route than traffic from origin server 220 to client device 210.

Network device 250 may assist with transferring TCP connections, with client device 210, from origin server 220 to proxy server 240. For example, origin server 220 may service a client request from client device 210 via a TCP connection. Network device 250 may assist in terminating the TCP connection between origin server 220 and client device 210, and establishing a TCP connection between proxy server 240 and client device 210 so that proxy server 240 may service the client request from client device 210.

In some implementations, network device 250 may determine whether the content requested by client device 210 is available on proxy server 240. This content check may be performed at the application layer of the TCP/IP protocol (e.g., layer 7 of the open systems interconnection (OSI) model), and the TCP connection transfer may be performed at the transport layer of the TCP/IP protocol (e.g., layer 4 of the OSI model). Connection request transfer protocol (CRTP) may assist in communication and coordination between the application layer (layer 7) and the transport layer (layer 4).

CRTP may be implemented as an application layer protocol, and may use TCP as a means for transportation at the transport layer. CRTP may be used to transfer a TCP connection from one node (e.g., origin server 220) to another node (e.g., proxy server 240). Additionally, or alternatively, CRTP may transfer application information from one node to another node. In some implementations, CRTP information and/or connection information (e.g., TCP connection information) described herein may be included in a client request (e.g., as an extension to HTTP). Additionally, or alternatively, CRTP may use user datagram protocol (UDP) as a means for transportation at the transport layer.

As shown by reference number 505, network device 250 and proxy server 240 may use CRTP to initialize, terminate, and/or keep alive a communication channel.

To initialize a communication channel between network device 250 and proxy server 240, network device 250 may transmit, to proxy server 240, a CRTP initialization request, and may receive a CRTP initialization response. Initialization may include using a mechanism (e.g., a cookie) that stores security information to protect against security attacks. For example, proxy server 240 may store security information (e.g., a hash value, a pre-shared key value, etc., which may be periodically changed). When sending the CRTP initialization request, network device 250 may request the security information. Proxy server 240 may transmit, in the CRTP initialization response, information that identifies the stored security information. Network device 250 may verify the received security information before completing initialization of the communication channel.

To terminate a communication channel between network device 250 and proxy server 240, network device 250 may transmit, to proxy server 240, a CRTP termination request, and may receive a CRTP termination response. The termination may remove proxy server 240 from association with proxy cluster 230.

Network device 250 may periodically send a CRTP keep-alive request to proxy server 240. If network device 250 does not receive a CRTP keep-alive response within a particular time period, network device 250 may terminate the communication channel. The CRTP keep-alive request may include a request for security information. Proxy server 240 may transmit, in the CRTP keep-alive response, security information stored by proxy server 240. Network device 250 may verify the received security information to keep the communication channel active. If the received security information is invalid, network device 250 may terminate the communication channel.

As shown by reference numbers 510-520, call flow 500 may include establishing a TCP connection between client device 210 and origin server 220 via a three-way handshake process. For example, as shown by reference number 510, client device 210 may transmit, to origin server 220 (via network device 250), a SYN packet. In some implementations, network device 250 may mute and/or remove information that identifies TCP options, included in a TCP header of the SYN packet, before routing the SYN packet to origin server 220. As shown by reference number 515, origin server 220 may transmit, to client device 210 (via network device 250), a SYN/ACK packet. As shown by reference number 520, client device 210 may transmit, to origin server 220 (via network device 250), an ACK packet. A TCP connection between client device 210 and origin device 220 may be established using this three-way handshake process (SYN, SYN/ACK, and ACK).

As shown by reference number 525, client device 210 may transmit, to network device 250, a client request. For example, the client request may include an application signature, such as a hypertext transfer protocol (HTTP) request (e.g., a GET request, a HEAD request, an HTTP/1.1 request, etc.), a simple mail transfer protocol (SMTP) request (e.g., a HELO request, an EHLO request, etc.), etc. In some implementations, network device 250 may intercept the client request without client device 210 explicitly transmitting the client request to network device 250.

As shown by reference number 530, network device 250 may determine connection information associated with the TCP connection and/or identified in the client request. For example, network device 250 may determine a source network address, a destination network address, a source port, a destination port, a sequence number, an acknowledgement number, a window size, etc., associated with the TCP connection. Additionally, or alternatively, network device 250 may determine application information associated with the TCP connection, such as an application associated with the TCP connection, application requirements associated with the TCP connection (e.g., bandwidth requirements, capacity requirements, jitter requirements, packet delay requirements, quality of service requirements, etc.), etc.

In some implementations, network device 250 may create a connection identifier for the TCP connection. Network device 250 may associate the connection identifier with packets associated with the TCP connection. The connection identifier may be used by network device 250 and/or proxy server 240 to identify packets associated with the TCP connection to be transferred from origin server 220 to proxy server 240. In some implementations, network device 250 more store the connection identifier, the connection information, and/or the application information in a data structure in order to track packets associated with the TCP connection.

As shown by reference number 535, network device 250 may select a proxy server 240 to service the client request. In some implementations, network device 250 may determine a selection algorithm used to select the proxy server 240. For example, the selection algorithm may be based on a round robin algorithm; a load balancing algorithm (e.g., least load first, most load first, etc.); an application hash algorithm (e.g., determining proxy server 240 based on an application associated with the TCP connection); a least connections algorithm (e.g., determining a proxy server 240 with the least number of established TCP connections); an enforced transfer algorithm (e.g., forcing a particular proxy server 240 to handle a particular TCP connection); and/or a weighted version of these or other algorithms.

In some implementations, the CRTP keep-alive request, transmitted by network device 250 to proxy server 240, may include information that identifies the selection algorithm. Additionally, or alternatively, the CRTP keep-alive response, transmitted by proxy server 240 to network device 250, may include status information that assists network device 250 in selecting a proxy device 240 using the selection algorithm. For example, the CRTP keep-alive request may identify a selection algorithm of least connections first, where network device 250 selects a proxy server 240, with the least number of established TCP connections, to service the client request. In this example, the CRTP keep-alive response may identify a number of TCP connections that have been established with proxy server 240. In this way, network device 250 may compare the number of TCP connections associated with multiple proxy servers 240, based on the status information identified in the CRTP keep-alive response received from each of the multiple proxy servers 240.

In some implementations, network device 250 may receive input (e.g., from a user and/or another device) to change the selection algorithm. For example, network device 250 may receive input to change the selection algorithm to a least load first algorithm, where network device 250 selects a proxy server 240 with the least load to service the client request. Subsequent CRTP keep-alive messages, transmitted by network device 250, may identify the least load first algorithm. In this example, the CRTP keep-alive response may identify a load on proxy server 240 that transmits the CRTP keep-alive response (e.g., a processing load, a memory load, etc.). In this way, network device 250 may select a proxy server 240 with a least amount of load to service the client request.

In some implementations, network device 250 may not use a selection algorithm. For example, network device 250 may use UDP as a transportation means for CRTP messages, and may operate in a multicast mode. In multicast mode, network device 250 may transmit the CRTP request to a multicast address that identifies multiple proxy servers 240 in proxy cluster 230. A proxy server 240 that is capable of servicing the client request may transmit a positive acknowledgement (ACK) that the client request can be serviced.

As shown by reference number 540, network device 250 may transmit a CRTP transfer request to the selected proxy server 240. The CRTP transfer request may include a connection transfer request that a TCP connection be transferred from a first device (e.g., origin server 220) to a second device (e.g., proxy server 240). In some implementations, the CRTP transfer request may identify the connection information (e.g., a source IP address, a destination IP address, an initial receive sequence (IRS) number, an initial send sequence (ISS) number, a source port, a destination port, etc. associated with the TCP connection), the application information, the client request, and/or the connection identifier.

In some implementations, the CRTP transfer request may include a packet that identifies a packet acknowledgement number and/or a packet sequence number. Network device 250 and/or proxy server 240 may determine an ISS number based on the packet acknowledgement number, such as by subtracting one from the packet acknowledgement number (PAN) (e.g., ISS=PAN−1). Likewise, network device 250 and/or proxy server 240 may determine an IRS number based on the packet sequence number, such as by subtracting one from the packet sequence number (PSN) (e.g., IRS=PSN−1). Network device 250 and/or proxy server 240 may use the ISS and IRS numbers to establish the TCP connection between client device 210 and proxy server 240 (e.g., to include the correct sequence and/or acknowledgement number in a packet included in a response to the client request).

Additionally, or alternatively, when transmitting the CRTP transfer request, network device 250 may queue a packet (or information that identifies a packet) associated with the client request. For example, network device 250 may queue packets based on priority. Network device 250 may compose a CRTP transfer request for a packet at the head of the queue, and may transmit the CRTP request to proxy server 240. Network device 250 may determine an amount of time that has passed since a packet was placed in the queue. If the amount of time satisfies (e.g., is equal to or greater than) a threshold, then network device 250 may route the packet to origin server 220. In some implementations, the threshold may be based on a TCP retransmission timeout value. In some implementations, the threshold may be based on and/or calculated according to:

$$TO_{CRTP} = SRTT \pm \max\{G, K \times RTT_{VAR}\},$$

where $TO_{CRTP}$ may be the threshold in seconds (e.g., a CRTP timeout value), SRTT may be a smoothed round-trip time in seconds (e.g., an estimated length of time for a TCP packet to be sent and a TCP acknowledgement to be received), $RTT_{VAR}$ may be a variation, in seconds, of the round-trip time, G may be a clock granularity in seconds, and K may be a user-input and/or machine-input constant (e.g., four).

As shown by reference number 545, proxy server 240 may validate the CRTP transfer request. For example, a packet included in the CRTP transfer request may include security information, such as a security key, a coded value, a hash value, etc. Proxy server 240 may validate the packet using, for example, a decoder, a hash function, etc.

As shown by reference number 550, proxy server 240 may confirm the CRTP transfer request. For example, proxy server 240 may determine whether the client request may be serviced by proxy server 240. In some implementations, proxy server 240 may determine whether content, requested in the client request, is stored by and/or accessible by proxy server 240. Additionally, or alternatively, proxy server 240 may determine whether proxy server 240 is able to service the request based on the connection information and/or the application information (e.g., application requirements).

As shown by reference number 555, proxy server 240 may transmit, to network device 250, a CRTP transfer response. The CRTP transfer response may include, for example, a positive response (e.g., an ACK) or a negative response (e.g., a NACK). If the CRTP transfer response includes a negative response (e.g., if proxy server 240 cannot service the client request), then network device 250 may route the client request to origin server 220. If the CRTP transfer response includes a positive response (e.g., if proxy server 240 can service the client request), then network device 250 and/or proxy server 240 may terminate the TCP connection between client device 210 and origin server 220 (e.g., as indicated by reference number 560), and may establish a TCP connection between client device 210 and proxy server 240 to service the client request (e.g., as indicated by reference number 565).

In some implementations, the CRTP transfer response may include connection information associated with proxy server 240. For example, the CRTP transfer response may include a policy-based routing value that indicates which packets are to be routed to proxy server 240 (e.g., based on connection information identified in the packets). Network device 250 may route the packet (and/or other packets) identified by the CRTP transfer request/response to proxy sever 240.

As shown by reference number 560, network device 250 and/or proxy server 240 may terminate the TCP connection between client device 210 and origin server 220. In some implementations, proxy server 240 may terminate the TCP connection by sending a TCP reset command to origin server 220. The TCP reset command may use the connection information to spoof client device 210. For example, the TCP reset command may identify a source network address, a source port, etc. associated with client device 210. Origin server 220 may terminate the TCP connection with client device 210 based on receiving the TCP reset command.

As shown by reference number 565, network device 250 may assist in establishing a TCP connection between proxy server 240 and client device 210, and proxy server 240 may service the client request. In some implementations, network device 250 may determine connection information associated with the TCP connection, and may transmit the connection information, to proxy server 240, along with a command that causes proxy server 240 to establish the TCP connection (e.g., by establishing a TCP socket to receive and/or transmit information associated with the client request). In some implementations, proxy server 240 may service the client request by providing the content, requested by client device 210 in the client request, to client device 210. In some implementations, proxy server 240 may provide the content to client device 210 via network device 250. Alternatively, proxy server 240 may provide the content to client device 210 without using network device 250. For example, proxy server 240 may provide the requested content to client device 210 by direct server return.

While a series of communications has been described with regard to FIG. 5, the communications and/or the order of the communications may be modified in some implementations. Additionally, or alternatively, non-dependent communications may be performed in parallel.

FIG. 6 is a diagram of an example call flow 600 for transferring a connection to a proxy server using the CRTP. FIG. 6 shows call flow 600 using a symmetric proxy cluster 230. A symmetric proxy cluster 240 may route traffic from client device 210 to origin server 220 via the same route as traffic from origin server 220 to client device 210. In some implementations, the call flow of FIG. 6 may apply when network device 250 is a load balancing device (e.g., a layer 7 load balancer) that filters and distributes incoming traffic to proxy cluster 230 (and/or outgoing traffic to client device 210). In this scenario, proxy servers 240 in proxy cluster 230 may share a virtual IP address.

As shown by reference numbers 605-615, network device 250 may intercept a request from client device 210 to establish a TCP connection with origin server 220. Intercepting the request may include establishing a TCP connection between client device 210 and network device 250 via a three-way handshake process. For example, as shown by reference number 605, client device 210 may transmit, and network device 250 may intercept and receive, a SYN packet. As shown by reference number 610, network device 250 may transmit, to client device 210, a SYN/ACK packet (e.g., which may spoof the destination address, destination port, etc. associated with origin server 220). As shown by reference number 615, client device 210 may transmit, and network device 250 may intercept and receive, an ACK packet. A TCP connection between client device 210 and network device 250 may be established using this three-way handshake process (SYN, SYN/ACK, and ACK).

Reference numbers 505 and 525-555 may be performed as described in connection with FIG. 5. For example, network device 250 may receive a client request, may transmit a CRTP request to proxy server 240 to determine whether proxy server 240 can service the client request, and may receive a CRTP response from proxy server 240.

If the CRTP response includes a positive response (e.g., if proxy server 240 can service the CRTP request), then network device 250 may terminate the TCP connection between client device 210 and network device 250 (reference number 620), and proxy server 240 may establish a TCP connection with client device 210 to service the client request (reference number 625).

While a series of communications has been described with regard to FIG. 6, the communications and/or the order of the communications may be modified in some implementations. Additionally, or alternatively, non-dependent communications may be performed in parallel.

FIGS. 7A-7F are diagrams of example implementations 700 relating to the example process shown in FIG. 4.

Figure 7A:
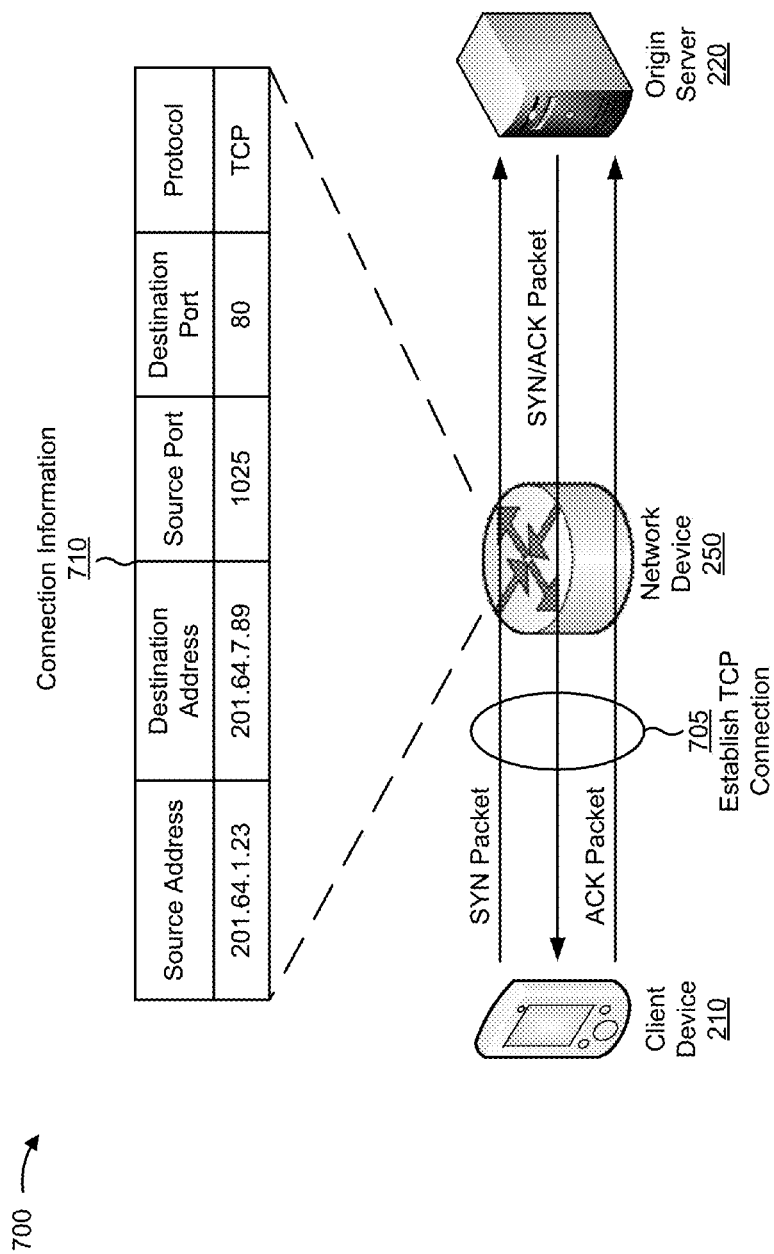

As shown in FIG. 7A, network device 250 may assist in establishing a TCP connection between client device 210 and origin server 220. For example, network device 250 may route a SYN packet from client device 210 to origin server 220, may route a SYN/ACK packet from origin server 220 to client device 210, and may route an ACK packet from client device 210 to origin server 220. As shown by reference number 705, this three-way handshake may establish a TCP connection between client device 210 and origin server 220.

As shown by reference number 710, network device 250 may determine connection information associated with the TCP connection (e.g., connection information identified in one or more of the SYN packet, the SYN/ACK packet, and/or the ACK packet). The connection information may include, for example, a source address (e.g., an IP address of client device 210), a destination address (e.g., an IP address of origin server 220), a source port (e.g., an endpoint or socket associated with the TCP connection on client device 210), a destination port (e.g., an endpoint or socket associated with the TCP connection on origin server 220), a protocol associated with the TCP connection (e.g., TCP), etc. In some implementations, network device 250 may store the connection information in a data structure, as shown by reference number 710, and may use the stored information to track packets associated with the TCP connection and/or a client request.

Figure 7B:
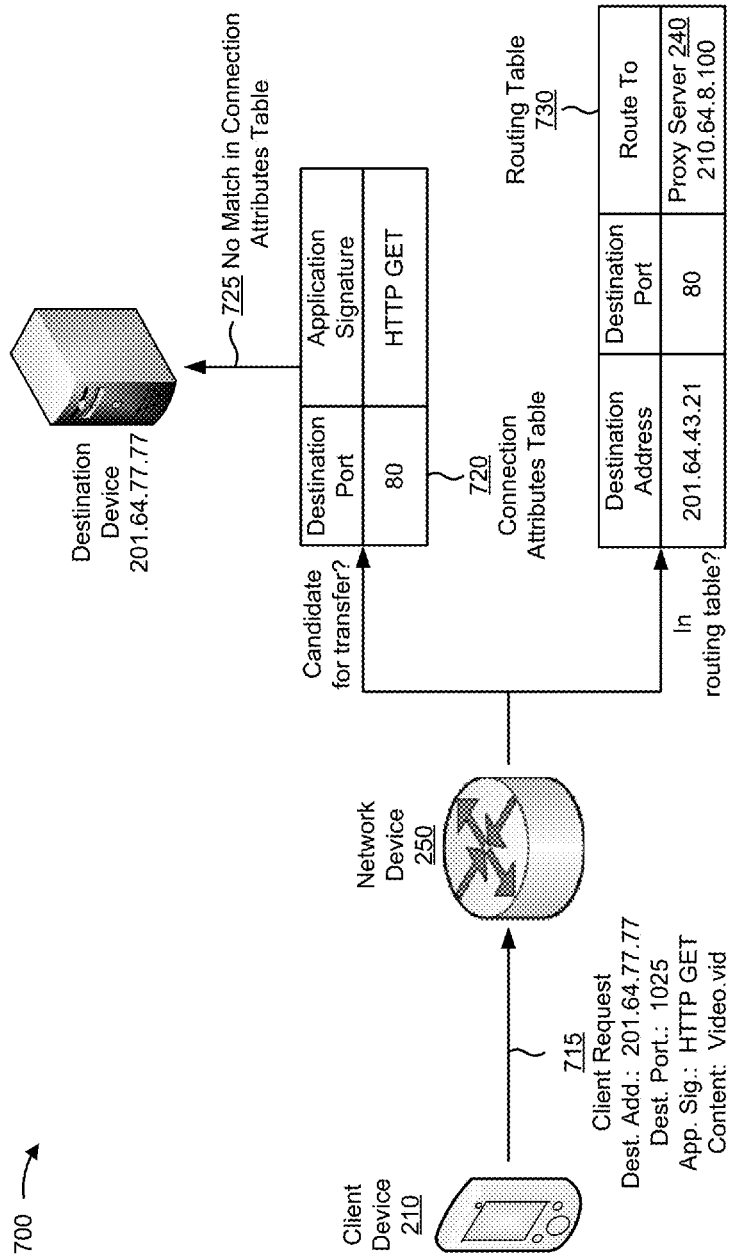

As shown in FIG. 7B, network device 250 may receive, from client device 210, a client request 715. The client request (which may include, e.g., a packet) may identify a destination address (201.64.77.77), a destination port (port 1025), an application signature (HTTP GET), requested content (video.vid), other connection information, and/or other information associated with requested content (e.g., application information).

Network device 250 may determine whether client request 715 is a candidate for a TCP connection transfer by comparing connection information identified by client request 715 to connection information stored in connection attributes table 720 (e.g., a data structure). Connection attributes table 720 may identify one or more attributes that qualify a client request for a connection transfer. For example, connection attributes table 720 may indicate that packets identifying a destination port of 80 and/or an application signature of HTTP GET are candidates for a connection transfer.

As shown by reference number 725, the attributes of client request 715 (e.g., destination port 1025) do not match the attributes stored in connection attributes table 720 (e.g., destination port 80). As a result, network device 250 may route client request 715 to a destination device identified in client request 715 (e.g., a destination device identified by IP address 201.64.77.77). Additionally, or alternatively, network device 250 may determine whether a connection attribute of client request 715 is identified in routing table 730, as described in connection with FIG. 7C.

Figure 7C:
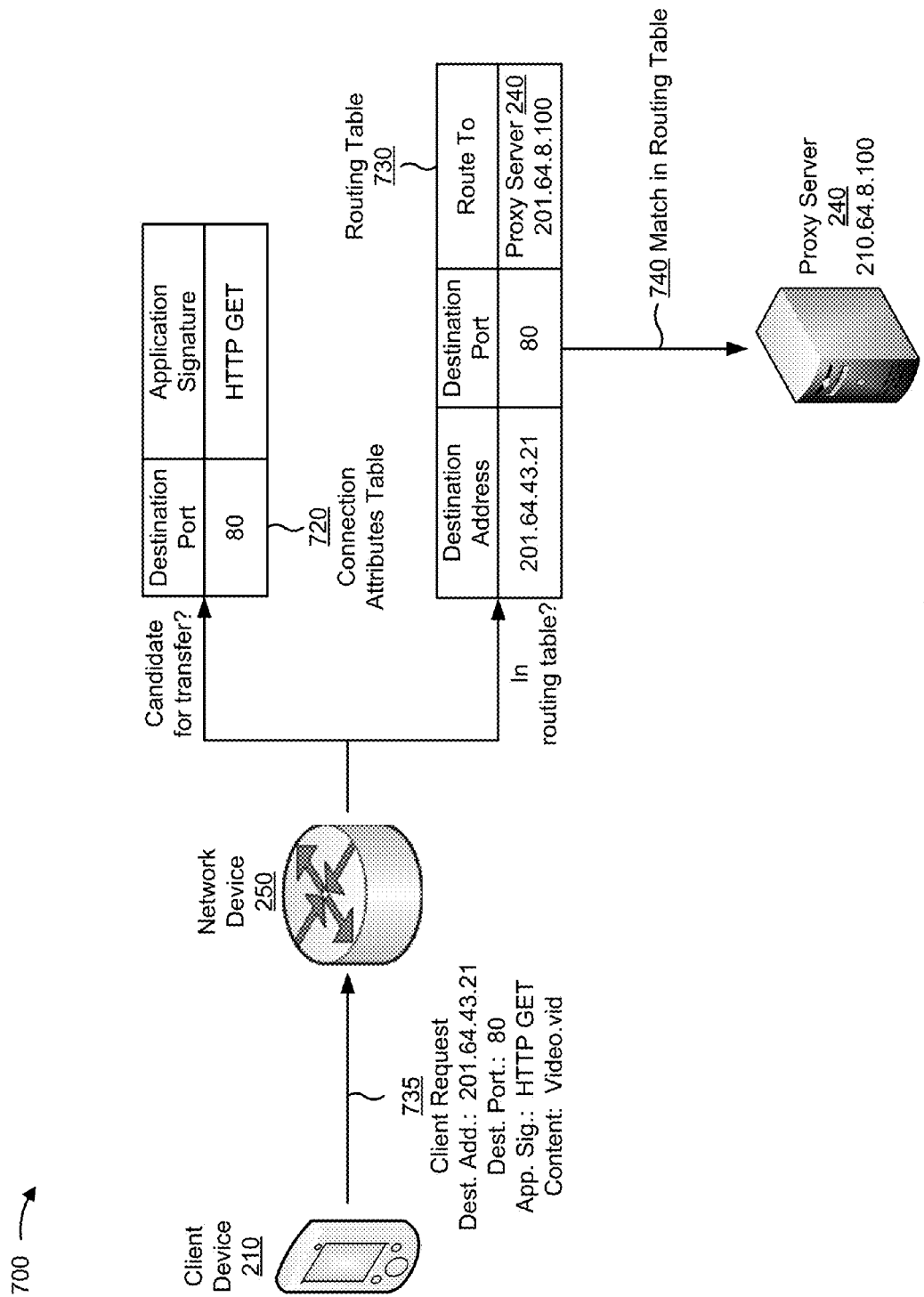

As shown in FIG. 7C, network device 250 may receive, from client device 210, a client request 735. The client request may identify a destination address (201.64.43.21), a destination port (port 80), an application signature (HTTP GET), requested content (video.vid), etc.

Network device 250 may determine whether a connection attribute of client request 735 is identified in routing table 730 (e.g., a data structure). Routing table 730 may identify one or more attributes that qualify a client request for routing to a destination address stored by routing table 730. For example, routing table 730 may indicate that packets identifying a destination address of 201.64.43.21 and a destination port of 80 are to be routed to proxy server 240 identified by a network address of 201.64.8.100.

As shown by reference number 740, the attributes of client request 735 (e.g., destination address 201.64.43.21 and destination port 80) match the attributes stored in routing table 730. As a result, network device 250 may route client request 735 to a destination device identified in routing table 730 (e.g., proxy server 240 identified by IP address 201.64.8.100).

Figure 7D:
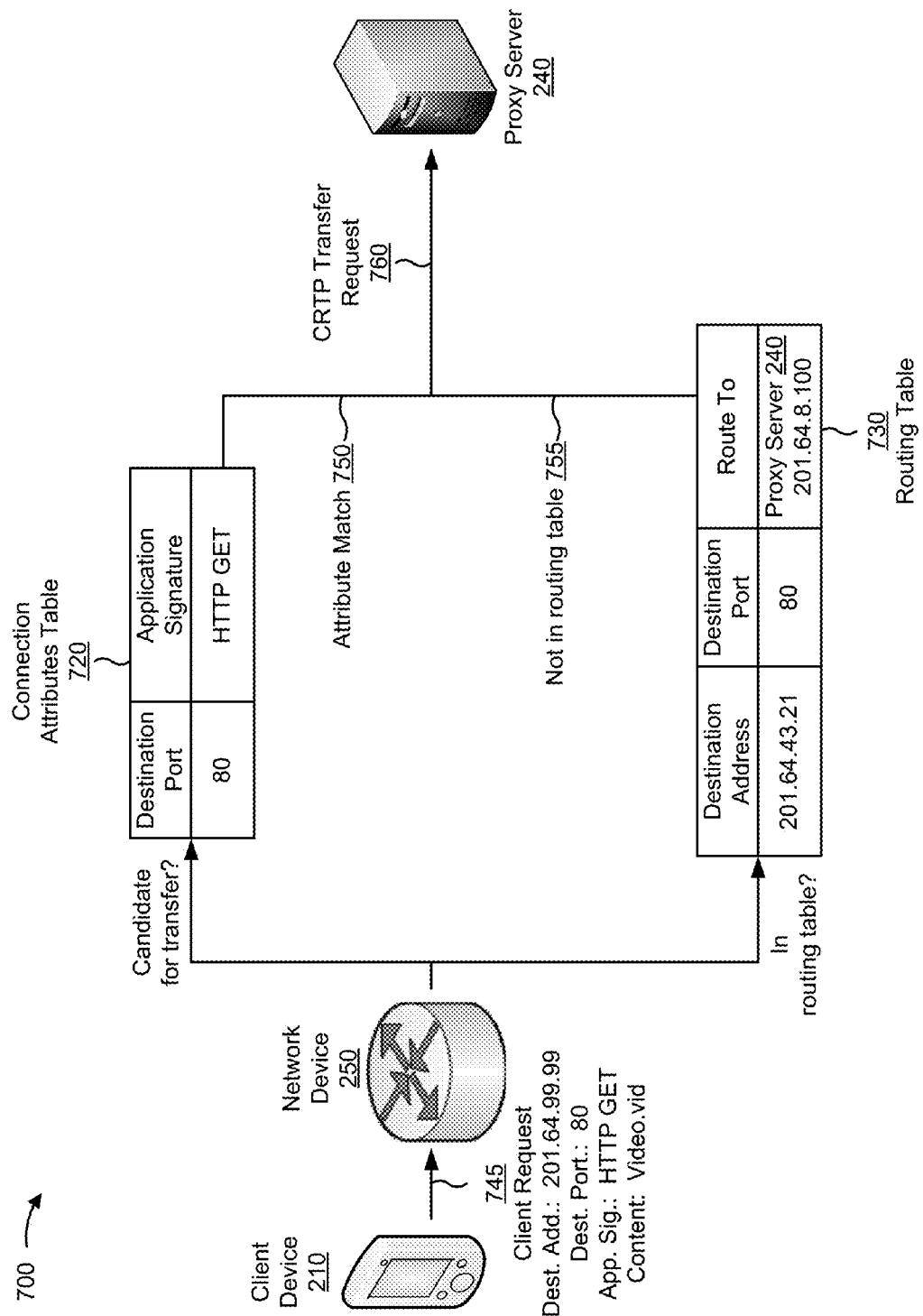

As shown in FIG. 7D, network device 250 may receive, from client device 210, a client request 745. The client request may identify a destination address (201.64.99.99), a destination port (port 80), an application signature (HTTP GET), requested content (video.vid), etc.

As shown by reference number 750, network device 250 may determine that the attributes of client request 745 (e.g., destination port 80 and application signature HTTP GET) match the attributes stored in connection attributes table 720. Additionally, as shown by reference number 755, network device 250 may determine that the attributes of client request 745 do not match the attributes stored in routing table 730 (e.g., destination address 201.64.43.21).

As shown by reference number 760, based on the determinations (750 and 755), network device 250 may transmit a CRTP transfer request to proxy server 240. The CRTP transfer request may identify client request 745, connection information associated with client request 745 (e.g., destination address, destination port, application signature, etc.), requested content associated with client request 745 (e.g., video.vid), application information associated with client request 745, etc.

As shown in FIG. 7E, proxy server 240 may determine that client request 745 cannot be serviced by proxy server 240. For example, proxy server 240 may determine that video.vid is not stored by proxy server 240. As shown by reference number 765, based on the determination that client request 745 cannot be serviced, proxy server 240 may transmit a negative response to network device 250. Additionally, or alternatively, proxy server 240 may not respond to the CRTP transfer request within a particular amount of time, causing a timeout event to occur.

As shown by reference number 770, if network device 250 receives a negative response from proxy server 240 and/or if the timeout event occurs, then network device 250 may route client request 745 to origin server 220 (or a device identified by a destination address associated with client request 745, such as 201.64.99.99).

Figure 7F:
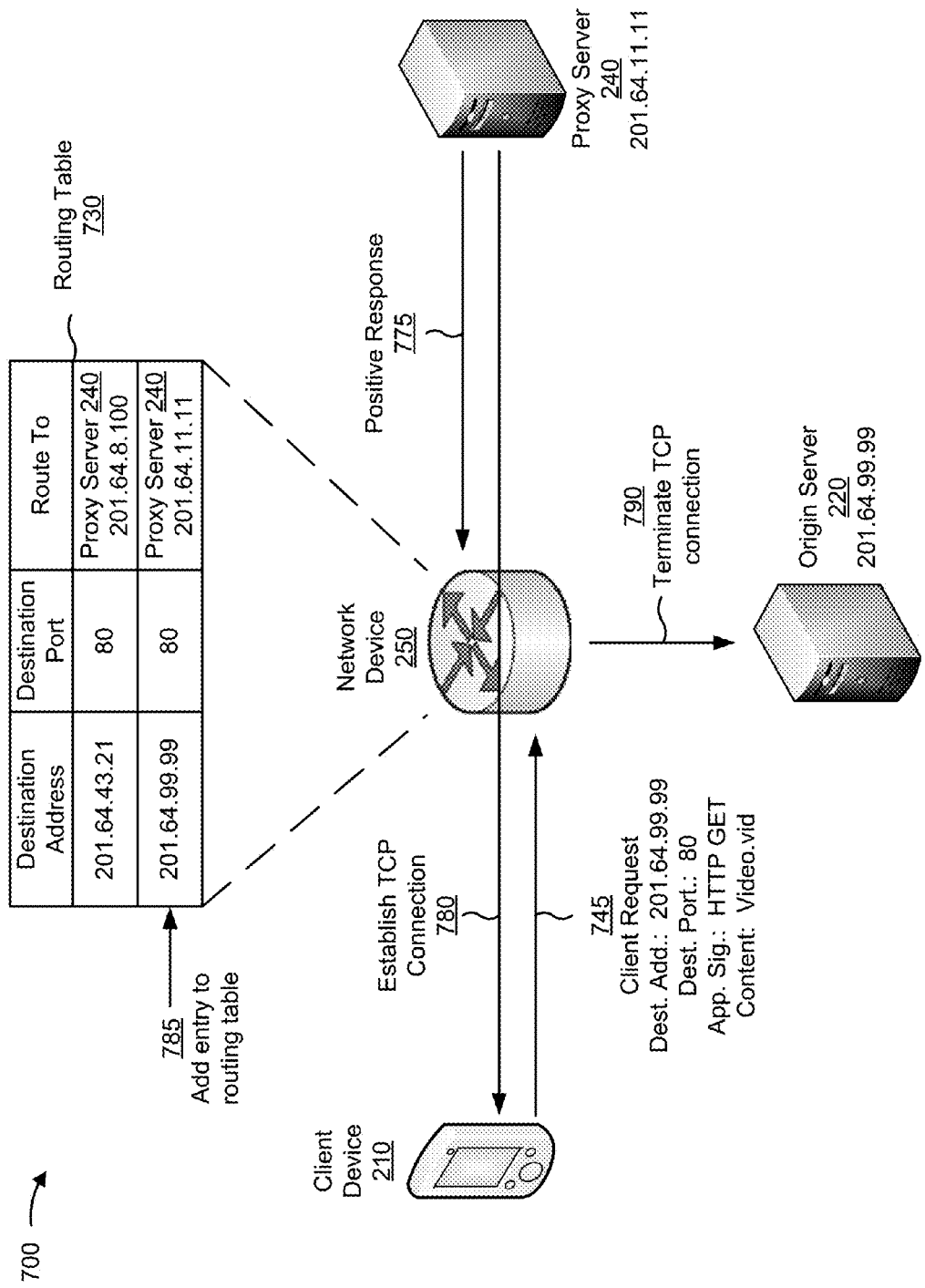

As shown in FIG. 7F, proxy server 240 may determine that client request 745 can be serviced by proxy server 240. For example, proxy server 240 may determine that video.vid is stored by proxy server 240. As shown by reference number 775, based on the determination that client request 745 can be serviced, proxy server 240 may transmit a positive response to network device 250.

As shown by reference number 780, network device 250 may assist in establishing a TCP connection between client device 210 and proxy server 240. For example, proxy server 240 may establish a TCP socket (or port) to establish the TCP connection and service requests from client device 210 (e.g., client request 745). As shown by reference number 785, network device 250 may store connection information associated with client request 745 (e.g., a source address, a destination address, a source port, a destination port, etc.) in routing table 730 so that network device 250 may route packets associated with client request 745 to proxy server 240.

As shown by reference number 790, network device 250 may assist in terminating a TCP connection (e.g., established in 705, FIG. 7A) between client device 210 and origin server 220. For example, network device 250 and/or proxy server 240 may transmit a TCP reset command to origin server 220, which may cause origin server 240 to terminate the TCP connection.

The foregoing disclosure provides illustration and description, but is not intended to be exhaustive or to limit the implementations to the precise form disclosed. Modifications and variations are possible in light of the above disclosure or may be acquired from practice of the implementations.

Certain implementations have been described herein with respect to TCP. In some implementations, the techniques described herein may be used in connection with other protocols, such as user datagram protocol (UDP) and/or other protocols included in the Internet protocol suite.

As used herein, the term "component" is intended to be broadly construed as hardware, firmware, or a combination of hardware and software.

The term "packet," as used herein, may refer to a packet, a datagram, a cell, a fragment of a packet, a fragment of a datagram, a fragment of a cell, or any other type or arrangement of data that may be carried at a specified communication layer.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive, from a client device, a client request associated with a first TCP connection between a server device and the client device,
the client request identifying requested content;
determine connection information that identifies the first TCP connection between the server device and the client device,
the connection information including at least one of a source port number associated with the first TCP connection, a destination port number associated with the first TCP connection, a packet sequence number associated with the first TCP connection, a packet acknowledgement number associated with the first TCP connection, or a TCP window size associated with the first TCP connection;
determine whether the client request is a candidate for a TCP connection transfer based on whether the connection information is identified in a routing table accessible to the device;
generate a connection transfer request to transfer the first TCP connection from the server device to a proxy server when the client request is the candidate for the TCP connection transfer,
the connection transfer request identifying the connection information and the requested content,
the connection transfer request being different than the client request;
transmit, to the proxy server, the connection transfer request,
the connection transfer request, transmitted to the proxy server, causing the first TCP connection to be transferred by establishing a second TCP connection between the proxy server and the client device,
the second TCP connection being established based on the connection information that identifies the first TCP connection and without the proxy server sending a TCP control packet to the client device;
receive, from the proxy server, an indication that the proxy server is capable of providing the requested content;
provide, from the proxy server and to the client device via the second TCP connection, a response to the client request, based on the indication; and
provide, from the proxy server and to the server device, information that causes the server device to terminate the first TCP connection, based on the indication.

2. The device of claim 1, where the one or more processors, when transmitting the connection transfer request, are to:

determine, based on the connection information, that the client request is associated with a connection to be transferred; and transmit the connection transfer request based on determining that the client request is associated with the connection to be transferred.

3. The device of claim 2, where the one or more processors, when determining that the client request is associated with the connection to be transferred, is to:

determine that the client request is associated with the connection to be transferred based on at least one of:
a port number identified by the client request;
a network address associated with the client request;
an application signature identified by the client request; or
a comparison of the connection information to information stored in the routing table.

4. The device of claim 1, where the one or more processors are further to:

transmit a keep-alive request to a plurality of proxy servers,
the keep-alive request identifying a selection algorithm to be used to select one of the plurality of proxy servers to service the client request;
receive a keep-alive response from one or more of the plurality of proxy servers,
the keep-alive response identifying status information associated with the one or more of the plurality of proxy servers, that identified status information being based on the selection algorithm;
select a particular proxy server, of the plurality of proxy servers, based on the selection algorithm and the status information; and
where the one or more processors, when transmitting the connection transfer request to the proxy server, are to:
transmit the connection transfer request to the particular proxy server.

5. The device of claim 1, where the one or more processors are further to:

route at least one packet that assists in establishing the first TCP connection;
where the one or more processors, when transmitting the connection transfer request to the proxy server, are to:
transmit, to the proxy server, information that identifies a packet acknowledgement number or a packet sequence number associated with the at least one packet; and
where the response to the client request includes information that is based on the packet acknowledgement number or the packet sequence number.

6. The device of claim 1, where the one or more processors are further to:

determine an amount of time that has passed since the connection transfer request was submitted to the proxy server;
determine that the amount of time satisfies a threshold that is based on a TCP retransmission timeout value; and
route the client request to the server device based on determining that the amount of time satisfies the threshold.

7. The device of claim 1, where the information that causes the server device to terminate the first TCP connection includes information that identifies the client device.

8. A non-transitory computer-readable medium storing instructions, the instructions comprising:

one or more instructions that, when executed by a processor of a network device, cause the processor to:

receive, from a client device, a client request associated with a first TCP connection between a server device and the client device,
the client request identifying requested content;
determine connection information, associated with the client request, that identifies the first TCP connection,
the connection information including at least one of a source port number associated with the client request, a destination port number associated with the client request, a packet sequence number associated with the client request, a packet acknowledgement number associated with the client request, or a TCP window size associated with the client request;
determine whether the client request is a candidate for a TCP connection transfer based on whether the connection information is identified in a routing table accessible to the network device;
generate a connection transfer request to transfer the first TCP connection from the server device to a proxy server when the client request is the candidate for the TCP connection transfer,
the connection transfer request identifying the connection information and the requested content,
the connection transfer request being different than the client request;
transmit, to the proxy server, the connection transfer request,
the connection transfer request transmitted to the proxy server causing the first TCP connection to be transferred by establishing a second TCP connection between the proxy server and the client device,
the second TCP connection being established based on the connection information that identifies the first TCP connection and without the proxy server sending a TCP control packet to the client device;
receive, from the proxy server, an indication that the requested content is accessible by the proxy server;
route, from the proxy server and to the client device via the second TCP connection, a response to the client request, based on the indication; and
route, from the proxy server and to the server device, information that causes the server device to terminate the first TCP connection, based on the indication.

9. The non-transitory computer-readable medium of claim 8, where the one or more instructions, that cause the processor to transmit the connection transfer request, cause the processor to:

determine, based on the connection information, that the client request is associated with a connection to be transferred; and
transmit the connection transfer request based on determining that the client request is associated with the connection to be transferred.

10. The non-transitory computer-readable medium of claim 9, where the one or more instructions, that cause the processor to determine that the client request is associated with the connection to be transferred, cause the processor to:

determine that the client request is associated with the connection to be transferred based on at least one of:
a port number identified by the client request;
a network address associated with the client request;
an application signature identified by the client request; or
a comparison of the connection information to information stored in the routing table.

11. The non-transitory computer-readable medium of claim 8, where the one or more instructions further cause the processor to:
- transmit a keep-alive request to a plurality of proxy servers,
  - the keep-alive request identifying a selection algorithm to be used to select one of the plurality of proxy servers to service the client request;
- receive a keep-alive response from one or more of the plurality of proxy servers,
  - the keep-alive response identifying status information associated with the one or more of the plurality of proxy servers, that identified status information being based on the selection algorithm;
- select a particular proxy server, of the plurality of proxy servers, based on the selection algorithm and the status information; and
- where the one or more instructions, that cause the processor to transmit the connection transfer request to the proxy server, cause the processor to:
  - transmit the connection transfer request to the particular proxy server.

12. The non-transitory computer-readable medium of claim 8, where the one or more instructions further cause the processor to:
- route at least one packet that assists in establishing the first TCP connection;
- where the one or more instructions, that cause the processor to transmit the connection transfer request to the proxy server, cause the processor to:
  - transmit, to the proxy server, information that identifies a packet acknowledgement number or a packet sequence number associated with the at least one packet; and
- where the response to the client request includes information that is based on the packet acknowledgement number or the packet sequence number.

13. The non-transitory computer-readable medium of claim 8, where the one or more instructions further cause the processor to:
- determine an amount of time that has passed since the connection transfer request was submitted to the proxy server;
- determine that the amount of time satisfies a threshold that is based on a TCP retransmission timeout value; and
- route the client request to the server device based on determining that the amount of time satisfies the threshold.

14. The non-transitory computer-readable medium of claim 8, where the connection information comprises at least one of:
- a source network address associated with the client request;
- a destination network address associated with the client request; or
- an application signature associated with the client request.

15. A method, comprising:
- receiving, by a network device and from a client device, a client request that identifies requested content;
- determining, by the network device, connection information that identifies a first TCP connection between the client device and a server device,
  - the connection information including at least one of a source port number associated with the first TCP connection, a destination port number associated with the first TCP connection, a packet sequence number associated with the first TCP connection, a packet acknowledgement number associated with the first TCP connection, or a TCP window size associated with the first TCP connection;
- determining, by the network device, whether the client request is a candidate for a TCP connection transfer based on whether the connection information is identified in a routing table accessible to the network device;
- generating, by the network device, a connection transfer request to transfer the first TCP connection from the server device to a proxy server when the client request is the candidate for the TCP connection transfer,
  - the connection transfer request identifying the connection information and the requested content,
  - the connection transfer request being different than the client request;
- transmitting, by the network device and to the proxy server, the connection transfer request,
  - the connection transfer request, transmitted to the proxy server, causing the first TCP connection to be transferred by establishing a second TCP connection between the proxy server and the client device,
  - the second TCP connection being established based on the connection information that identifies the first TCP connection and without the proxy server sending a TCP control packet to the client device;
- receiving, by the network device and from the proxy server, an indication that the requested content is stored by the proxy server;
- routing, by the network device and from the proxy server to the client device via the second TCP connection, a response to the client request, based on the indication; and
- routing, by the network device and from the proxy server to the server device, information that causes the server device to terminate the first TCP connection, based on the indication.

16. The method of claim 15, where transmitting the connection transfer request comprises:
- determining that the client request is associated with a connection to be transferred, based on at least one of:
  - a port number identified by the client request,
  - a network address associated with the client request,
  - an application signature identified by the client request, or
  - a comparison of the connection information to information stored in the routing table; and
- transmitting the connection transfer request based on determining that the client request is associated with the connection to be transferred.

17. The method of claim 15, further comprising:
- transmitting a keep-alive request to a plurality of proxy servers,
  - the keep-alive request identifying a selection algorithm to be used to select one of the plurality of proxy servers to service the client request;
- receiving a keep-alive response from one or more of the plurality of proxy servers,
  - the keep-alive response identifying status information associated with the one or more of the plurality of proxy servers, that identified status information being based on the selection algorithm;
- selecting a particular proxy server, of the plurality of proxy servers, based on the selection algorithm and the status information; and
- where transmitting the connection transfer request to the proxy server comprises:
  - transmitting the connection transfer request to the particular proxy server.

18. The method of claim 15, further comprising:
routing at least one packet that assists in establishing the first TCP connection;
where transmitting the connection transfer request to the proxy server comprises:
  transmitting, to the proxy server, information that identifies a packet acknowledgement number or a packet sequence number associated with the at least one packet; and
where the response to the client request includes information that is based on the packet acknowledgement number or the packet sequence number.

19. The method of claim 15, further comprising:
determining an amount of time that has passed since the connection transfer request was submitted to the proxy server;
determining that the amount of time satisfies a threshold that is based on a TCP retransmission timeout value; and
routing the client request to the server device based on determining that the amount of time satisfies the threshold.

20. The method of claim 15, where the connection information comprises at least one of:
a source network address associated with the first TCP connection;
a destination network address associated with the first TCP connection; or
a protocol associated with the first TCP connection.

* * * * *